United States Patent
Arai

(10) Patent No.: US 9,899,686 B2
(45) Date of Patent: Feb. 20, 2018

(54) METHOD FOR PRODUCING FUEL CELL CATALYST

(71) Applicant: TOYOTA JIDOSHA KABUSHIKI KAISHA, Toyota-shi, Aichi-ken (JP)

(72) Inventor: Tatsuya Arai, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/303,373

(22) PCT Filed: Feb. 18, 2015

(86) PCT No.: PCT/JP2015/054480
§ 371 (c)(1),
(2) Date: Oct. 11, 2016

(87) PCT Pub. No.: WO2015/159582
PCT Pub. Date: Oct. 22, 2015

(65) Prior Publication Data
US 2017/0033366 A1   Feb. 2, 2017

(30) Foreign Application Priority Data
Apr. 16, 2014  (JP) ................. 2014-084789

(51) Int. Cl.
*H01M 4/04*   (2006.01)
*H01M 4/88*   (2006.01)
(Continued)

(52) U.S. Cl.
CPC ....... *H01M 4/8842* (2013.01); *H01M 4/9016* (2013.01); *H01M 4/92* (2013.01);
(Continued)

(58) Field of Classification Search
CPC .... H01M 4/04; H01M 4/8842; H01M 4/9016; H01M 4/926; B01J 21/063; B01J 21/18; B01J 21/42; B01J 35/003; B01J 37/00
(Continued)

(56) References Cited

U.S. PATENT DOCUMENTS 2,704,281 A * 3/1955 Appell .............. B01J 23/38
502/27
5,182,136 A * 1/1993 Saburi .............. G01N 27/16
264/7
(Continued)

FOREIGN PATENT DOCUMENTS

JP     2005-251455 A    9/2005
JP     2006-134613      5/2006
(Continued)

*Primary Examiner* — Brian K Talbot
(74) *Attorney, Agent, or Firm* — Andrews Kurth Kenyon LLP

(57) ABSTRACT

The present invention is to provide a method for producing a fuel cell catalyst that is configured to be able to increase the power generation performance of a membrane-electrode assembly. Disclosed is a method for producing a fuel cell catalyst, wherein the method comprises: a mixing step in which, by mixing a platinum-containing solution, a titanium-containing solution and an electroconductive support in a solvent, a catalyst precursor in which a platinum ion compound and a titanium ion compound are supported on the electroconductive support, is formed; a solvent removing step in which, by removing the solvent from a mixture thus obtained after the mixing step, the catalyst precursor is obtained; a firing step in which, by firing the catalyst precursor at a temperature of 500 to 900° C. in a hydrogen gas atmosphere after the solvent removing step, a fired product in which a composite containing the platinum and the titanium oxide is supported on the electroconductive support, is obtained; and a washing step in which, by washing the fired product with hydrofluoric acid after the firing step, a catalyst in which the composite containing the platinum and the titanium oxide is supported on the electroconductive support, is obtained.

6 Claims, 10 Drawing Sheets

(51) Int. Cl.
  *H01M 4/92* (2006.01)
  *H01M 4/90* (2006.01)
  *B05D 3/10* (2006.01)
  *H01M 8/1018* (2016.01)

(52) U.S. Cl.
  CPC ........... *H01M 4/925* (2013.01); *H01M 4/926* (2013.01); *B05D 3/107* (2013.01); *H01M 8/1018* (2013.01)

(58) Field of Classification Search
  USPC ................. 427/113, 115; 501/101, 182, 185
  See application file for complete search history.

(56) References Cited

U.S. PATENT DOCUMENTS

| | | | |
|---|---|---|---|
| 5,326,736 | A | 7/1994 | Hashimoto et al. |
| 7,018,951 | B2 * | 3/2006 | Gaffney ................. B01J 23/002 502/311 |
| 7,704,918 | B2 | 4/2010 | Adzic et al. |
| 2004/0219420 | A1 * | 11/2004 | Tada ..................... H01M 4/926 502/185 |
| 2006/0257719 | A1 * | 11/2006 | Merzougui ......... H01M 4/8605 429/442 |
| 2006/0263675 | A1 | 11/2006 | Adzic et al. |
| 2007/0042259 | A1 | 2/2007 | Fan et al. |
| 2009/0068505 | A1 | 3/2009 | Adzic et al. |
| 2012/0178018 | A1 * | 7/2012 | Querner .............. H01M 4/8647 429/524 |

FOREIGN PATENT DOCUMENTS

| | | |
|---|---|---|
| JP | 2006-193392 A | 7/2006 |
| JP | 2006-527464 A | 11/2006 |
| JP | 2009-522100 A | 6/2009 |
| JP | 2010-501345 A | 1/2010 |
| WO | 91/04790 A1 | 4/1991 |
| WO | 2007/081774 A2 | 7/2007 |
| WO | 2008/025751 A1 | 3/2008 |

* cited by examiner

US 9,899,686 B2

METHOD FOR PRODUCING FUEL CELL CATALYST

CROSS-REFERENCE TO RELATED APPLICATIONS

This is a national phase application based on the PCT International Patent Application No. PCT/JP2015/054480 filed Feb. 18, 2015, claiming priority to Japanese Patent Application No. 2014-084789 filed Apr. 16, 2014, the entire contents of both of which are incorporated herein by reference.

TECHNICAL FIELD

The present invention relates to a method for producing a fuel cell catalyst.

BACKGROUND ART

A fuel cell is a cell in which a fuel and an oxidant are supplied to two electrically-connected electrodes to electrochemically oxidize the fuel, thereby converting chemical energy directly to electrical energy. Accordingly, it is not limited by the Carnot cycle and shows high energy conversion efficiency. A fuel cell generally includes a stack of fuel cells, each having a membrane electrode assembly (MEA) as the basic structure which is composed of a pair of electrodes and an electrolyte membrane sandwiched therebetween.

Platinum and platinum alloy materials have been used as the electrode catalyst of a fuel electrode (anode electrode) and an oxidant electrode (cathode electrode) in a fuel cell. However, platinum in an amount that is required of an electrode catalyst using the latest technology, is still too expensive to realize a commercial mass production of fuel cells. Accordingly, there have been studies trying to reduce the amount of platinum contained in the fuel and oxidant electrodes of a fuel cell, by combining platinum with an inexpensive material.

In recent years, a fuel cell catalyst in which platinum-metal oxide composite particles are supported on an electroconductive support, has attracted attention as a fuel cell electrode catalyst. For example, an electrode catalyst for polymer electrolyte fuel cells is disclosed in Patent Literature 1, which is composed of composite particles made of platinum or a platinum-containing noble metal alloy and a metal oxide other than noble metals, and which is used for the air electrode of a polymer electrolyte fuel cell that includes a membrane electrode assembly composed of a solid polymer electrolyte membrane, which is permeable to protons, and fuel and air electrodes, each of which includes a catalyst layer containing an electrode catalyst.

CITATION LIST

Patent Document 1: Japanese Patent Application Laid-Open No. 2006-134613

SUMMARY OF INVENTION

Technical Problem

However, a conventional fuel cell catalyst in which platinum-metal oxide composite particles are supported on an electroconductive support, has such a problem that power generation performance that is equivalent to catalyst activity per unit mass of platinum (hereinafter may be referred to as platinum mass activity) and is obtained by an electrochemical measurement using a rotating disk electrode (RDE) when the catalyst is in the form of a powder catalyst, cannot be obtained when it is used in an membrane electrode assembly.

Platinum-metal oxide composite particles are likely to aggregate and unlikely to be uniformly supported on an electroconductive support. The reasons are considered as follows, for example: in the production of a membrane electrode assembly, the inside of an aggregate of platinum-metal oxide composite particles cannot be covered with an ionomer, and the metal oxide on the platinum-metal oxide composite particle surface and the metal oxide particles present solely on the electroconductive support are superhydrophilic, so that once the metal oxide and the metal oxide particles adsorb water or an ionomer, they are unlikely to be detached and inhibit the transfer of oxygen, water and protons.

This is a phenomenon that is specific to membrane electrode assemblies. In the electrochemical measurement using an RDE, it does not occur since the electrolyte is responsible for proton conduction and oxygen diffusion.

The present invention was achieved in light of the above circumstance. An object of the present invention is to provide a method for producing a fuel cell catalyst that is configured to be able to increase the power generation performance of membrane electrode assemblies.

Solution to Problem

The fuel cell catalyst production method of the present invention is a method for producing a fuel cell catalyst in which a composite containing platinum and a titanium oxide is supported on an electroconductive support, wherein the method comprises:

a mixing step in which, by mixing a platinum-containing solution, a titanium-containing solution and an electroconductive support in a solvent, a catalyst precursor in which a platinum ion compound and a titanium ion compound are supported on the electroconductive support, is formed;

a solvent removing step in which, by removing the solvent from a mixture thus obtained after the mixing step, the catalyst precursor is obtained;

a firing step in which, by firing the catalyst precursor at a temperature of 500 to 900° C. in a hydrogen gas atmosphere after the solvent removing step, a fired product in which a composite containing the platinum and the titanium oxide is supported on the electroconductive support, is obtained; and a washing step in which, by washing the fired product with hydrofluoric acid after the firing step, a catalyst in which the composite containing the platinum and the titanium oxide is supported on the electroconductive support, is obtained.

It is preferable that in the mixing step of the fuel cell catalyst production method of the present invention, the catalyst precursor is formed in a reducing gas or inert gas atmosphere, by use of tetrahydrofuran (dehydrated) as the solvent, a solution containing tris(dibenzylideneacetone) diplatinum as the platinum-containing solution, and a solution containing tetrachlorobis(tetrahydrofuran)titanium(IV) as the titanium-containing solution.

It is preferable that in the fuel cell catalyst production method of the present invention, a mixed solvent of water and isopropyl alcohol is used as the solvent; a solution containing $K_2Pt(OH)_6$ is used as the platinum-containing solution; and a solution containing $Ti(O-i-C_3H_7)_2(C_6H_{14}O_3N)_2$ is used as the titanium-containing solution.

It is preferable that in the fuel cell catalyst production method of the present invention, the electroconductive support contains at least one of a carbonaceous material and a metal material.

Advantageous Effects of Invention

According to the present invention, a method for producing a fuel cell catalyst that is configured to be able to increase the power generation performance of membrane electrode assemblies, can be provided.

DESCRIPTION OF EMBODIMENTS

The fuel cell catalyst production method of the present invention is a method for producing a fuel cell catalyst in which a composite containing platinum and a titanium oxide is supported on an electroconductive support, wherein the method comprises:

a mixing step in which, by mixing a platinum-containing solution, a titanium-containing solution and an electroconductive support in a solvent, a catalyst precursor in which a platinum ion compound and a titanium ion compound are supported on the electroconductive support, is formed;

a solvent removing step in which, by removing the solvent from a mixture thus obtained after the mixing step, the catalyst precursor is obtained;

a firing step in which, by firing the catalyst precursor at a temperature of 500 to 900° C. in a hydrogen gas atmosphere after the solvent removing step, a fired product in which a composite containing the platinum and the titanium oxide is supported on the electroconductive support, is obtained; and a washing step in which, by washing the fired product with hydrofluoric acid after the firing step, a catalyst in which the composite containing the platinum and the titanium oxide is supported on the electroconductive support, is obtained.

The reason why the fuel cell catalyst that is able to, even when it is contained in an MEA, exhibit power generation performance that is equivalent to platinum mass activity measured when the fuel cell catalyst is in the form of a powder catalyst, can be obtained by the present invention, is inferred as follows: first, the platinum-containing solution, the titanium-containing solution and the electroconductive support are mixed in the solvent (the platinum-metal oxide composite particles are not directly supported on the electroconductive support); the solutions are uniformly supported on the electroconductive support in the form of the platinum ion compound and the titanium ion compound and then fired to turn the platinum ion compound and the titanium ion compound into the platinum-titanium oxide composite particles; therefore, the platinum-titanium oxide composite particles can be uniformly dispersed and present on the electroconductive support, without aggregation.

The reason is also inferred as follows: by washing a sintered product obtained after the firing step with the hydrofluoric acid, a titanium oxide layer on the composite surface and titanium oxide particles present solely on the electroconductive support can be selectively removed, and the coverage of the composite surface with the platinum (platinum coverage) can be increased.

Figure 1:
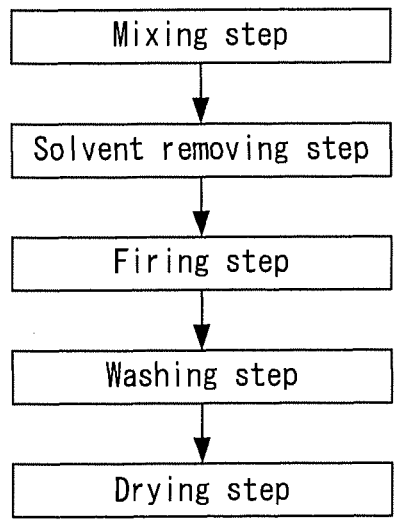
FIG. 1 is a flow chart of an example of the fuel cell catalyst production method of the present invention.

FIG. 1 is a flow chart of an example of the fuel cell catalyst production method of the present invention.

The fuel cell catalyst production method shown in FIG. 1 includes (1) the mixing step, (2) the solvent removing step, (3) the firing step, (4) the washing step and (5) a drying step.

The fuel cell catalyst production method of the present invention includes (1) the mixing step, (2) the solvent removing step, (3) the firing step and (4) the washing step. As needed, the production method includes (5) the drying step, etc., after the washing step.

Hereinafter, these steps will be explained in order.

(1) Mixing Step

The mixing step is a step in which, by mixing a platinum-containing solution, a titanium-containing solution and an electroconductive support in a solvent, a catalyst precursor in which a platinum ion compound and a titanium ion compound are supported on the electroconductive support, is formed.

The catalyst precursor is not particularly limited, as long as the platinum ion compound and the titanium ion compound are supported on the electroconductive support.

The platinum ion compound and the titanium ion compound supported on the electroconductive support may be in the form of ions or in the form of a compound.

The platinum-containing solution is not particularly limited, as long as it contains a platinum compound. It is preferably a solution in which part or all of the platinum ions are dissociated and present in the solution. It is particularly preferably a homogeneous solution in which all of the platinum ions are dissociated and present in the solution.

Examples of the platinum compound used for the platinum-containing solution include platinum salts and platinum complexes. More specifically, the examples include $Pt_2(dba)_3$ (tris(dibenzylideneacetone)diplatinum), $K_2Pt(OH)_6$, $K_2PtCl_4$ and $K_2PtCl_6$.

The platinum concentration of the platinum-containing solution is not particularly limited.

The solvent that can be used for the platinum-containing solution can be the same as the solvent that will be used in the below-described mixing.

The titanium-containing solution is not particularly limited, as long as it contains a titanium compound. It is preferably a solution in which part or all of the titanium ions are dissociated and present in the solution. It is particularly preferably a solution in which all of the titanium ions are dissociated and present in the solution.

Examples of the titanium compound used for the titanium-containing solution include titanium salts and titanium complexes. More specifically, the examples include $TiCl_4(THF)_2$ (tetrachlorobis(tetrahydrofuran)titanium(IV)) and $Ti(O-i-C_3H_7)_2(C_6H_{14}O_3N)_2$ (diisopropoxybis(triethanolaminato)titanium).

The titanium solution of the titanium-containing solution is not particularly limited.

The solvent that can be used for the titanium-containing solution can be the same as the solvent that will be used in the below-described mixing.

The electroconductive support is not particularly limited. Examples thereof include electroconductive carbonaceous materials such as carbon particles and carbon fibers, and metal materials such as metal particles and metal fibers. Examples of the carbon particles include Ketjen Black (product name; manufactured by: Ketjen Black International Company), Vulcan (product name: manufactured by: Cabot), Norit (product name; manufactured by: Norit), Black Pearls (product name; manufactured by: Cabot) and Acetylene Black (product name; manufactured by: Chevron). Examples of the carbon fibers include carbon nanotubes, carbon nanohorns, carbon nanowalls and carbon nanofibers.

The electroconductive support may be immersed and dispersed in the solvent by being added in a powdery form to the solvent. Or, the electroconductive support may be dispersed in the solvent in advance to prepare an electroconductive support dispersion, and the platinum-containing solution and the titanium-containing solution may be added to the electroconductive support dispersion.

The solvent that can be used for the electroconductive support dispersion can be the same as the solvent that will be used in the below-described mixing.

The solvent that is used in the mixing is not particularly limited. It is preferably a solvent that is able to mix the platinum-containing solution and the titanium-containing solution and prepare the homogeneous solution. Examples thereof include water, toluene, xylene, isopropyl alcohol and tetrahydrofuran, and a mixed solvent of water and isopropyl alcohol is preferred. When a deliquescent compound (e.g., tetrachlorobis(tetrahydrofuran)titanium(IV)) is used as the solvent, a dehydrated solvent (e.g., tetrahydrofuran(dehydrated)) is preferred from the viewpoint of preparing the homogeneous solution.

The platinum concentration and titanium concentration of the solvent are not particularly limited. The molar ratio of the platinum to the titanium (platinum:titanium) is preferably 1:1 to 3:1.

When the deliquescent compound (e.g., tetrachlorobis(tetrahydrofuran)titanium(IV)) is used as the solvent, from the viewpoint of preventing deliquescence, it is preferable that an inert gas (e.g., nitrogen gas or argon gas) or a reducing gas (e.g., hydrogen gas) is bubbled into the solvent in advance.

The mixing time is not particularly limited. It is preferably 30 minutes or more.

The mixing method is not particularly limited. It is preferable that they are dispersed and stirred by use of a ultrasonic homogenizer, a magnetic stirrer, a motor equipped with stirring blades, or the like.

When the deliquescent compound (e.g., tetrachlorobis(tetrahydrofuran)titanium(IV)) is used, from the viewpoint of preventing deliquescence, it is preferable that the mixing step is carried out in an inert gas atmosphere (e.g., nitrogen atmosphere) or a reducing gas atmosphere (e.g., hydrogen atmosphere).

(2) Solvent Removing Step

The solvent removing step is a step in which, by removing the solvent from a mixture thus obtained after the mixing step, the catalyst precursor is obtained.

The method for removing the solvent is not particularly limited. Examples thereof include distillation by an evaporator and reduced-pressure drying by a vacuum pump.

In the solvent removing step, after the solvent is removed, the catalyst precursor is pulverized and mixed as needed. The pulverizing and mixing method is the same as the below-described drying step.

(3) Firing Step

The firing step is a step in which, by firing the catalyst precursor at a temperature of 500 to 900° C. in a hydrogen gas atmosphere after the solvent removing step, a fired product in which a composite containing the platinum and the titanium oxide is supported on the electroconductive support, is obtained.

The composite is not particularly limited, as long as it contains the platinum and the titanium oxide. The composite is preferably a composite oxide of the platinum and the titanium oxide. Also, the composite is preferably a composite obtained by alloying the platinum and the titanium and then oxidizing the titanium.

The titanium oxide is not particularly limited. Examples thereof include $TiO_{2-x}$ (x=1.99 to 0.01).

The firing method is not particularly limited. Examples thereof include resistance heating (direct resistance, indirect resistance), induction heating, arc heating, a heat gun, a hot plate, and plasma irradiation.

The firing temperature is not particularly limited, as long as it is 500 to 900° C. It is preferably 600° C. When the firing temperature is more than 900° C., sintering occurs, so that the particle diameter becomes too large and may decrease the catalytic activity. When the firing temperature is 500° C. or more, it is suggested from the results of simultaneous thermogravimetry/differential thermal analysis (TG/DTA) measurement, that alloying of the platinum and the titanium is promoted.

The firing rate is not particularly limited. From the viewpoint of obtaining thermal uniformity and reproducibility, it is preferably 5 to 30° C./min.

The firing time is not particularly limited, as long as the composite containing the platinum and the titanium oxide is obtained. For example, the firing time can be 1 to 5 hours.

The concentration of the hydrogen gas is not particularly limited. Preferred is 100% hydrogen.

The hydrogen gas supply flow rate is not particularly limited. It is preferably 800 to 3000 mL/min.

In the firing step, after the firing, catalyst precursor is cooled down as needed, and after the cooling, the resultant is oxidized in an oxygen-containing gas atmosphere.

As the cooling method, examples include allowing to cool down, furnace cooling and electric cooling.

The cooling rate is not particularly limited. For example, it is preferably 1° C./min to rapid cooling.

The oxygen-containing gas is not particularly limited. From the viewpoint of gradually oxidizing the titanium, it is preferably a mixed gas of 5% oxygen and 95% nitrogen.

The oxidizing time is not particularly limited. When the mixed gas of 5% oxygen and 95% nitrogen is used, the oxidizing time is preferably 3 to 6 hours.

(4) Washing Step

The washing step is a step in which, by washing the fired product with hydrofluoric acid after the firing step, a catalyst in which the composite containing the platinum and the titanium oxide is supported on the electroconductive support, is obtained.

By washing the fired product with the hydrofluoric acid, the titanium oxide present on the platinum-titanium oxide composite particle surface and on the electroconductive support can be dissolved, with little dissolving of the platinum and the electroconductive support; therefore, the titanium oxide, which is a cause of a decrease in MEA performance, can be removed.

Also, by selectively dissolving the titanium oxide on the platinum-titanium oxide composite particle surface, the platinum-titanium oxide composite particle surface can be uniformly covered with the platinum, and the catalytic activity can be increased.

It is preferable that the fired product is dispersed and washed in the hydrofluoric acid. The method for dispersing the fired product in the hydrofluoric acid is not particularly limited. Examples thereof include a dispersion method using a ultrasonic homogenizer, a magnetic stirrer, a motor equipped with stirring blades, or the like.

The concentration of the hydrofluoric acid is not particularly limited, as long as the titanium oxide can be dissolved. The concentration is preferably 1 to 46% by mass, and particularly preferably 20 to 46% by mass.

The temperature of the hydrofluoric acid is not particularly limited. It is preferably 15 to 25° C.

The time of washing the fired product with the hydrofluoric acid is not particularly limited. It is preferably 1 to 6 hours.

(5) Drying Step

The drying step is a step of drying the fuel cell catalyst obtained after the washing step.

The method for drying the fuel cell catalyst is not particularly limited, as long as the solvent, etc., can be removed. Examples thereof include a reduced-pressure drying method and a method for keeping a temperature of 50 to 100° C. for 6 to 12 hours in an inert gas atmosphere.

As needed, the fuel cell catalyst can be pulverized. The pulverizing method is not particularly limited, as long as solids can be pulverized. Examples thereof include a pulverizing method using a mortar or the like in an inert gas atmosphere or in the air, and mechanical milling such as a ball mill or a turbo mill.

EXAMPLES

Example 1

Synthesis of $Pt_2(Dba)_3$

First, 20.00 g of sodium acetate, 16.86 g of dibenzylideneacetone (dba) and 430 mL of ethanol were put into a 1 L four-necked flask.

The temperature of an oil bath was set to 50° C. Argon gas was bubbled into the mixture for one hour.

Meanwhile, 10.00 g of $K_2PtCl_4$ was dissolved in 86 mL of ultrapure water. Argon gas was bubbled into the resulting aqueous solution for one hour.

The $K_2PtCl_4$ aqueous solution was added to the ethanol solution in the 1 L four-necked flask, in a dropwise manner.

Argon gas was flowed into the mixture, instead of being bubbled into the mixture, and the temperature of the oil bath was set to 100° C.

The mixture was refluxed for 12 hours, and then the heat source was turned off.

After the temperature of the reaction solution decreased to room temperature, suction filtration was carried out thereon.

Then, 150 mL of ultrapure water was added to a sample thus collected, and the mixture was stirred for 15 minutes at room temperature. Then, the sample was collected by suction filtration. This operation was repeated three times.

The collected sample was dried under reduced pressure for 48 hours, thereby obtaining $Pt_2(dba)_3$.

[Mixing Step]

The following operations were all carried out inside a glove box.

As an electroconductive support, 2.10 g of Vulcan dried under reduced pressure at 130° C. for 12 hours, was put into a 500 mL beaker. As a solvent, 210 mL of deoxidized/dehydrated THF was put into the beaker. With stirring the THF solution with stirrer tips, the solution was subjected to one-minute homogenization and one-minute suspension of the homogenization. This cycle was repeated for 20 minutes. Then, to cool the THF solution having an increased temperature, the solution was stirred for 30 minutes, thereby preparing an electroconductive support dispersion.

As a titanium compound, 1.24 g of $TiCl_4$ $(THF)_2$ was dissolved in 50 mL of deoxidized/dehydrated THF, which is a solvent, and passed through a filter having a pore size of 5 μm, thereby preparing a titanium-containing solution. Then, the titanium-containing solution was added to the electroconductive support dispersion in a dropwise manner.

As a platinum compound, 2.02 g of $Pt_2(dba)_3$ was dissolved in 200 mL of deoxidized/dehydrated THF and passed through a filter having a pore size of 5 μm, thereby preparing a platinum-containing solution. Then, the platinum-containing solution was added to the electroconductive support dispersion in a dropwise manner.

Then, with stirring the mixed solution with stirrer tips, the solution was subjected to five-second homogenization and five-second suspension of the homogenization. This cycle was repeated for 20 minutes.

To cool the mixed solution having an increased temperature, the mixed solution was stirred for 30 minutes, thereby forming a catalyst precursor in which the platinum ion compound and the titanium ion compound were supported on the electroconductive support.

[Solvent Removing Step]

To prevent the sample from bumping and scattering, the beaker was changed to a 2 L beaker. With stirring the mixed solution with stirrer tips, the mixed solution was depressurized inside the glove box to distill THF away. Then, the sample was collected and pulverized in an agate mortar, thereby obtaining a catalyst precursor.

[Firing Step]

The inside of a tubular furnace was depressurized with a vacuum pump, kept for 10 minutes and then purged with argon. This operation was repeated five times.

Inside the glove box, 1.20 g of the catalyst precursor was put into a quartz boat.

The hole of the boat was covered with a parafilm. Then, the boat was sealed in a zippered bag.

The boat being sealed in the zippered bag was taken out of the glove box. With sending argon gas at a flow rate of 1000 mL/min, the boat was placed inside the tubular furnace.

The inside of the tubular furnace was depressurized with a vacuum pump, kept for 10 minutes and then purged with argon. This operation was repeated five times.

With sending 100% hydrogen at a flow rate of 1000 mL/min, the temperature of the furnace was increased by 100° C. every 15 minutes so as to set the firing rate to 10° C./min. Thus, the temperature inside the tubular furnace was increased from room temperature to 500° C. and kept at 500° C. for two hours. Then, the heat source was turned off to naturally cool the temperature.

After the temperature of the furnace decreased to room temperature, the supplied gas was switched to a mixed gas of 5% oxygen and 95% nitrogen, and the gas supply was kept for three hours, thereby obtaining a fired product.

[Washing Step]

Then, 0.40 g of the fired product obtained in the firing step and 100 mL of 46% hydrofluoric acid were put into a 300 mL plastic cup and stirred at room temperature for 6 hours with stirrer tips. After the stirring, the reaction solution was subjected to suction filtration to collect a sample.

Then, 100 mL of ultrapure water was added to the collected sample, and the mixture was stirred for 20 minutes at room temperature. After the stirring, suction filtration was carried out thereon. Washing with ultrapure water was repeated until the filtrate became neutral.

A catalyst cake thus obtained was dried under reduced pressure for 12 hours, thereby obtaining a fuel cell catalyst ($Pt/TiO_{1.81}/C$).

Example 2

A fuel cell catalyst was produced in the same manner as Example 1, except that CA250 was used as the electroconductive support, and the firing temperature was set to 600° C. in the firing step.

Example 3

A fuel cell catalyst was produced in the same manner as Example 1, except that the firing temperature was set to 900° C. in the firing step.

Example 4

A fuel cell catalyst was produced in the same manner as Example 1, except that the firing temperature was set to 700° C. in the firing step.

Comparative Example 1

A fuel cell catalyst was produced in the same manner as Example 1, except that the washing step was not carried out.

Comparative Example 2

A fuel cell catalyst was produced in the same manner as Example 1, except that the firing temperature was set to 900° C. in the firing step, and the washing step was not carried out.

Comparative Example 3

As the fuel cell catalyst, a platinum-supported carbon (TEC10E50E) (hereinafter referred to as Pt/C) was used.

[XRD Measurement]

Figure 2:
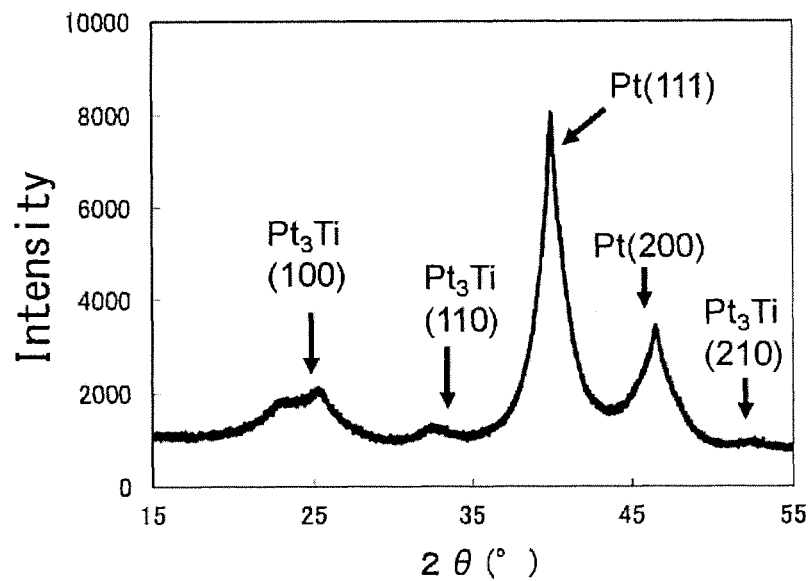
FIG. 2 is a view showing the XRD measurement result of a sintered product obtained in Example 4.

To conform the alloying of the fired platinum and titanium, X-ray diffraction (XRD) measurement was carried out on the fired product of Example 4 (fired at 700° C. in the firing step) before being subjected to the washing step. The result is shown in FIG. 2. Since $Pt_3Ti$ peaks were confirmed around 2θ=25°, 33°, 52°, it is clear that the platinum and the titanium were slightly alloyed with each other after the firing in the firing step and oxygen introduction.

[XPS Measurement]

Figure 3:
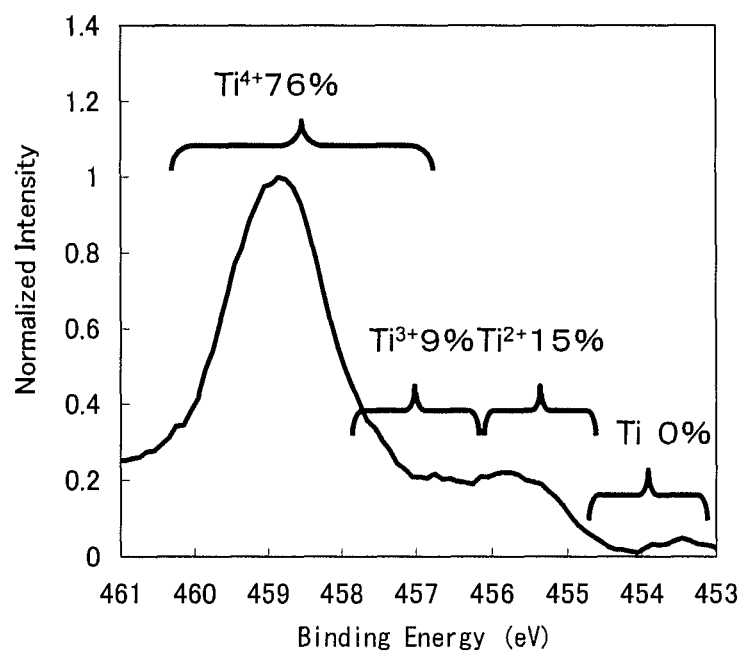
FIG. 3 is a view showing the XPS measurement result of a fuel cell catalyst obtained in Example 3.

To confirm the oxidation of the fired titanium, X-ray photoelectron spectroscopy (XPS) measurement was carried out on the fuel cell catalyst of Example 3, which was fired at 900° C. The result is shown in FIG. 3. Since any titanium metal (Ti) peak was not confirmed, it is clear that in the obtained fuel cell catalyst, the titanium in the range from the catalyst surface that is able to be involved in a reaction to a depth of about 5 nm was all oxidized. It is also clear that the composition of the composite containing the platinum and the titanium oxide is $Pt$—$TiO_{1.81}$.

[TEM-EDS Analysis]

Figure 4A:
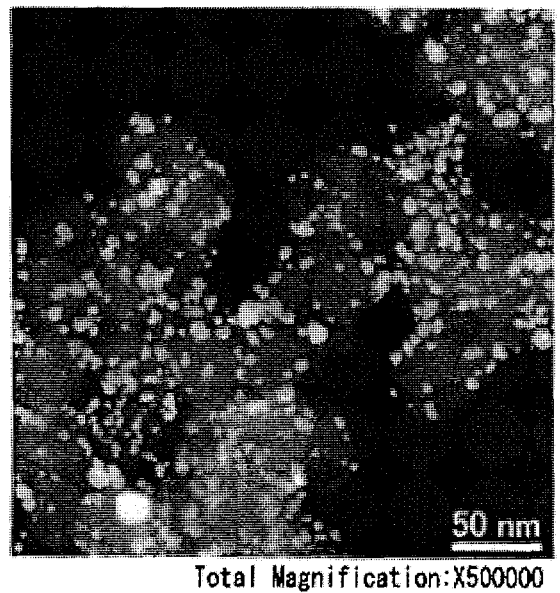
FIG. 4A is a TEM image of a fuel cell catalyst in Example 1.
Figure 4B:
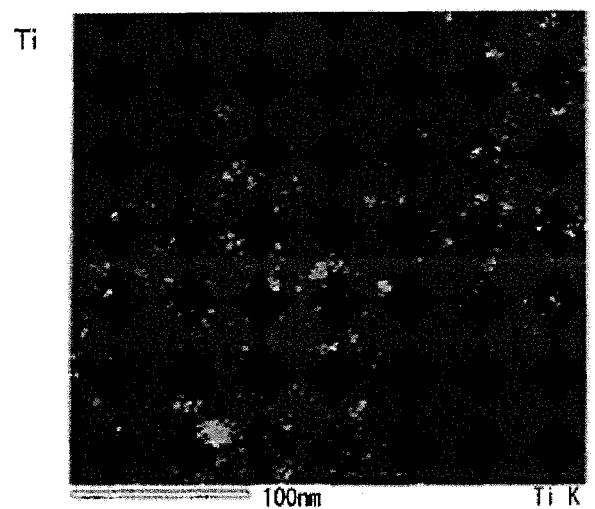
FIG. 4B is a TEM image showing only the titanium contained in the fuel cell catalyst in Example 1.
Figure 4C:
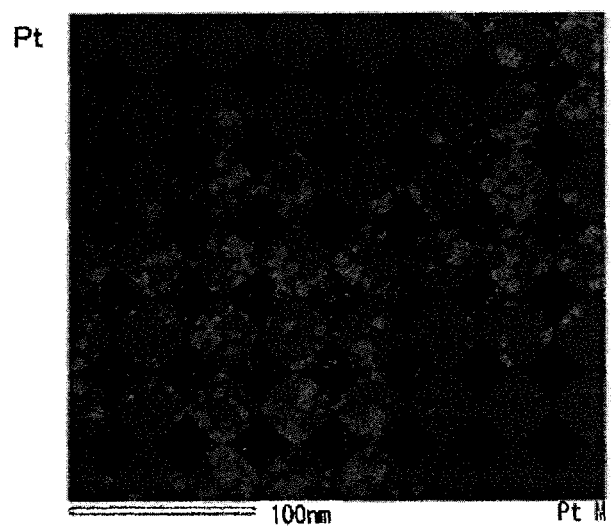
FIG. 4C is a TEM image showing only the platinum contained in the fuel cell catalyst in Example 1.
Figure 4D:
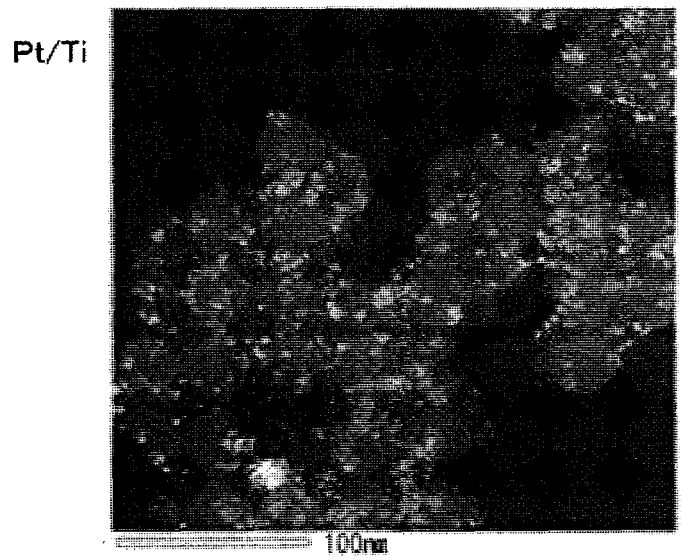
FIG. 4D is a TEM image showing the platinum, titanium and electroconductive support contained in the fuel cell catalyst in Example 1.
Figure 5A:
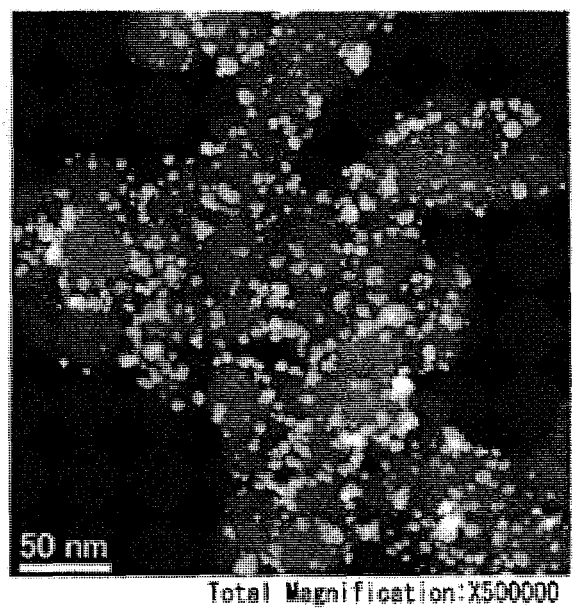
FIG. 5A is a TEM image of the fuel cell catalyst in Example 3.
Figure 5B:
FIG. 5B is a TEM image showing only the titanium contained in the fuel cell catalyst in Example 3.
Figure 5C:
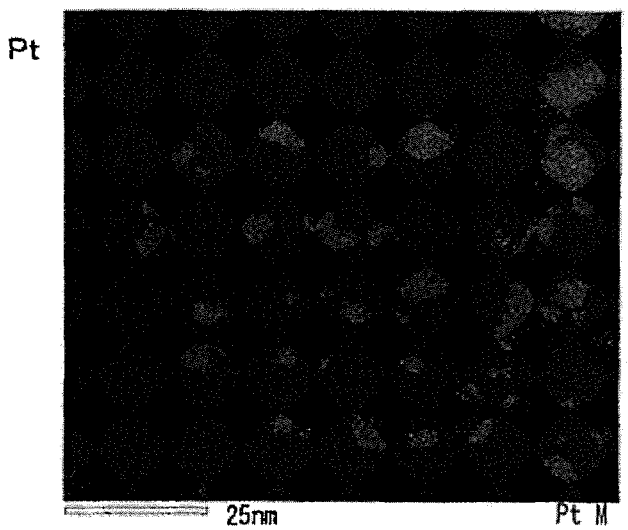
FIG. 5C is a TEM image showing only the platinum contained in the fuel cell catalyst in Example 3.
Figure 5D:
FIG. 5D is a TEM image showing the platinum, titanium and electroconductive support contained in the fuel cell catalyst in Example 3.

To confirm the distribution of the particles present on the electroconductive support, the fuel cell catalyst of Example 1 (fired at 500° C.) and the fuel cell catalyst of Example 3 (fired at 900° C.) were analyzed by energy dispersive X-ray spectroscopy (EDS) using a transmission electron microscope (TEM). The results of Example 1 are shown in FIGS. 4A to 4D. The results of Example 3 are shown in FIGS. 5A to 5D. FIGS. 4A and 5A are each a TEM image of the fuel cell catalyst. FIGS. 4B and 5B are each a TEM image showing only the titanium contained in the fuel cell catalyst. FIGS. 4C and 5C are each a TEM image showing only the platinum contained in the fuel cell catalyst. FIGS. 4D and 5D are each a TEM image showing only the platinum, titanium and electroconductive support contained in the fuel cell catalyst.

As shown in FIGS. 4A and 5A, it was confirmed that the platinum-titanium oxide composite particles are uniformly dispersed and present on the electroconductive support, without aggregation.

As shown in FIGS. 4B to 4D and 5B to 5D, it was confirmed that the position of the platinum and titanium present on the electroconductive support is almost the same, and there is almost no single platinum particle and single titanium oxide particle.

Therefore, from FIGS. 4A to 4D and 5A to 5D, it was confirmed that only the platinum-titanium oxide composite particles are uniformly dispersed and present on the electroconductive support.

[TEM-EELS Analysis]

Figure 6A:
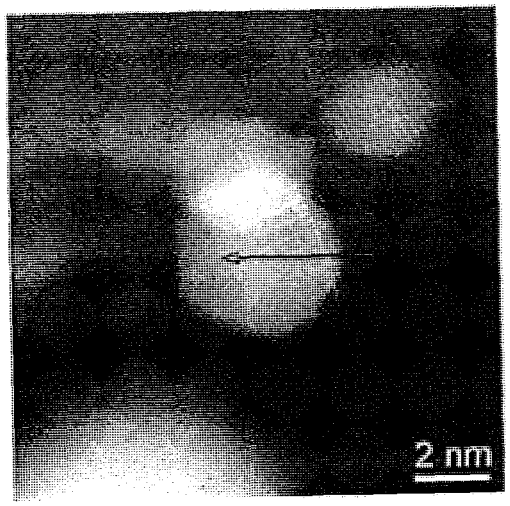
FIG. 6A is a TEM image of the fuel cell catalyst in Example 1.
Figure 6B:
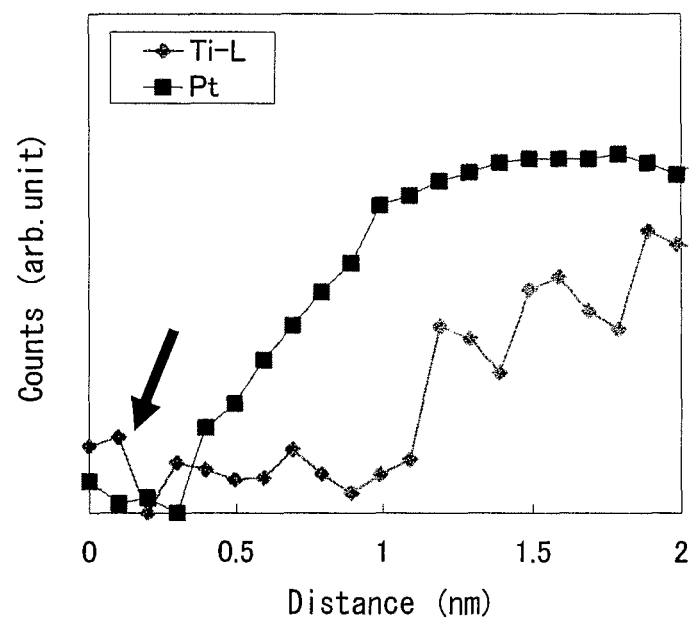
FIG. 6B is a view showing the Pt/Ti oxide concentration ratio of the fuel cell catalyst shown in FIG. 6A before being subjected to the washing step, which was observed along an arrow direction shown in FIG. 6A.
Figure 6C:
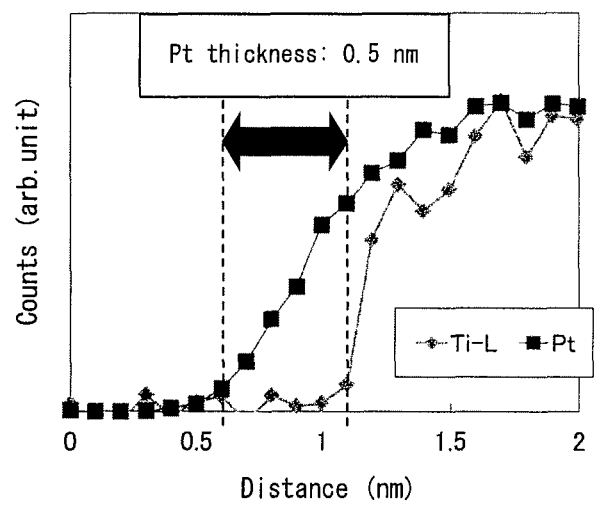
FIG. 6C is a view showing the Pt/Ti oxide concentration ratio of the fuel cell catalyst shown in FIG. 6A after being subjected to the washing step, which was observed in the arrow direction shown in FIG. 6A.

To confirm the effect of the hydrofluoric acid washing, along the arrow direction shown in TEM images (FIGS. 6A and 7A), TEM-EELS (electron energy loss spectroscopy) analysis was carried out on the fuel cell catalyst of Example 1 (fired at 500° C.) before and after being subjected to the washing step and the fuel cell catalyst of Example 3 (fired at 900° C.) before and after being subjected to the washing step. The results of Example 1 are shown in FIGS. 6A to 6C. The results of Example 3 are shown in FIGS. 7A to 7C.

Figure 7A:
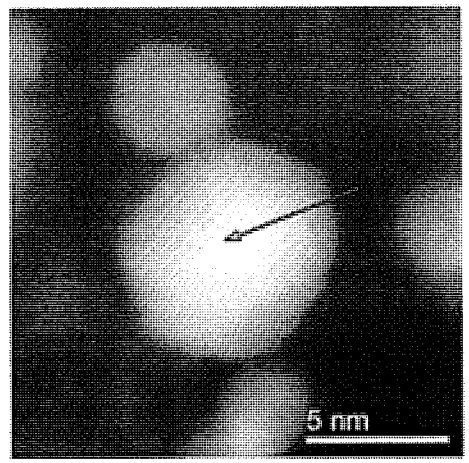
FIG. 7A is a TEM image of the fuel cell catalyst in Example 3.
Figure 7B:
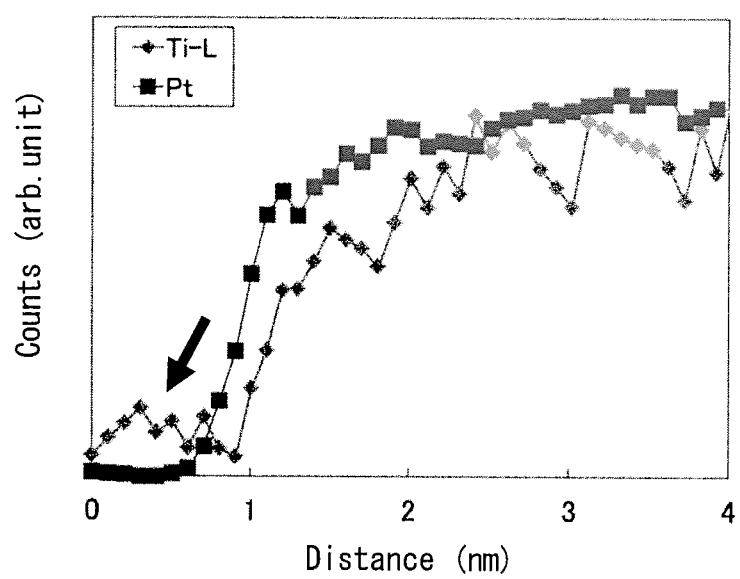
FIG. 7B is a view showing the Pt/Ti oxide concentration ratio of the fuel cell catalyst shown in FIG. 7A before being subjected to the washing step, which was observed along an arrow direction shown in FIG. 7A.
Figure 7C:
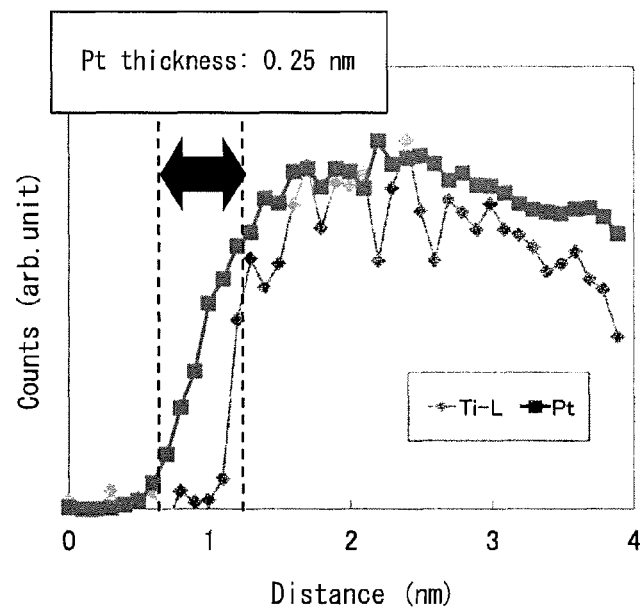
FIG. 7C is a view showing the Pt/Ti oxide concentration ratio of the fuel cell catalyst shown in FIG. 7A after being subjected to the washing step, which was observed along the arrow direction shown in FIG. 7A.

FIGS. 6A and 7A are each a TEM images of the fuel cell catalyst.

FIG. 6B is a view showing the Pt/Ti oxide concentration ratio of the fuel cell catalyst shown in FIG. 6A before being subjected to the washing step, which was observed in the arrow direction shown in FIG. 6A. FIG. 7B is a view showing the Pt/Ti oxide concentration ratio of the fuel cell catalyst shown in FIG. 7A before being subjected to the washing step, which was observed in the arrow direction shown in FIG. 7A. As shown in FIGS. 6B and 7B, the fuel cell catalyst before being subjected to the washing step has a high titanium oxide concentration on the catalyst surface (an area indicated by an arrow in FIGS. 6B and 7B). Therefore, it was confirmed that the titanium oxide ($TiO_{2-x}$) remains on the catalyst surface.

FIG. 6C is a view showing the Pt/Ti oxide concentration ratio of the fuel cell catalyst shown in FIG. 6A after being subjected to the washing step, which was observed in the arrow direction shown in FIG. 6A. FIG. 7C is a view showing the Pt/Ti oxide concentration ratio of the fuel cell catalyst shown in FIG. 7A after being subjected to the washing step, which was observed in the arrow direction shown in FIG. 7A. As shown in FIGS. 6C and 7C, for the fuel cell catalysts after being subjected to the washing step, it was confirmed that the titanium oxide was removed from the catalyst surface, compared to FIGS. 6B and 7B. Moreover, it was confirmed that in FIG. 6C, almost no titanium oxide is present in a range from the catalyst surface to a depth of 0.5 nm (a range indicated by an arrow in FIG. 6C) and in FIG. 7C, almost no titanium oxide is present in a range from the catalyst surface to a depth of 0.25 nm (an area indicated by an arrow in FIG. 7C) and the catalyst surface was covered with the platinum.

[Mass Activity Evaluation]

Samples were taken from the fuel cell catalysts obtained in Examples 1 to 3 and Comparative Examples 1 to 3. Each sample was added to a mixed solution of 5% Nafion (trade name) dispersion ("DE521" manufactured by DuPont), pure water and 2-propanol and dispersed with a homogenizer, thereby preparing a catalyst ink. The catalyst ink was applied onto the glassy carbon electrode of a rotating disk electrode (RDE) (manufacture by Hokuto Denko Corporation) and dried.

Then, oxidation-reduction reaction (ORR) measurement was carried out on each fuel cell catalyst.

ORR measurement conditions are as follows.

Electrolyte: 0.1 M perchloric acid aqueous solution (saturated with oxygen in advance)

Atmosphere: In oxygen atmosphere

Sweep rate: 10 mV/sec

Potential sweep range: 0.1 to 1.05 V (vs. RHE)

Rotational frequency of rotating disk electrode: 1600 rpm

From an oxygen reduction wave obtained by the ORR measurement, the catalytic activity (MA) per unit mass of the platinum in each fuel cell catalyst was measured.

The catalytic activity per unit mass of the platinum in each fuel cell catalyst was obtained as follows: in the oxygen reduction wave obtained by the ORR measurement, the current value at 0.9 V (vs. RHE) in the second cycle was determined as oxygen reduction current ($I_{0.9}$), and the current value at 0.4 V (vs. RHE) in the same cycle was determined as diffusion limited current ($I_{lim}$); an activation controlled current (Ik) was obtained by the following formula (1); and the catalytic activity (A/g-Pt) per unit mass of the platinum was measured by dividing Ik (A) by the platinum amount (g) contained in the fuel cell catalyst applied onto the glassy carbon electrode.

$$Ik=(I_{lim} \times I_{0.9})/(I_{lim}-I_{0.9}) \quad \text{[Formula (1)]}$$

The meaning of the symbols in the formula (1) are as follows:

Ik: Activation controlled current (A)

$I_{lim}$: Diffusion limited current (A)

$I_{0.9}$: Oxygen reduction current (A)

The measurement results for the catalytic activity (MA) per unit mass of the platinum are shown in Table 1.

As shown in Table 1, it is clear that MA is 343 A/g in Example 1; 720 A/g in Example 2; 350 A/g in Example 3; 261 A/g in Comparative Example 1; 295 A/g in Comparative Example 2; and 200 A/g in Comparative Example 3. It is clear that MA is higher in Example 1 (washed after firing at 500° C.) than in Comparative Example 1 (not washed after firing at 500° C.). It is also clear that MA is higher in Example 3 (washed after firing at 900° C.) than in Comparative Example 2 (not washed after firing at 900° C.) Therefore, it is clear that MA can be increased by hydrofluoric acid washing.

It is also clear that MA is the highest in Example 2 (washed after firing at 600° C.)

[Electrochemical Surface Area]

Cyclic voltammetry (CV) measurement was carried out on the fuel cell catalysts obtained in Examples 1 to 3 and Comparative Examples 1 to 3, and the electrochemical surface area (ECSA) of each fuel cell catalyst was calculated.

In the same manner as the above-mentioned mass activity evaluation, a catalyst ink was produced and applied to a glassy carbon electrode (RDE) and dried. Then, CV measurement was carried out.

CV measurement conditions are as follows.

Electrolyte: 0.1 M perchloric acid aqueous solution (saturated with Ar in advance by bubbling Ar gas thereinto at 30 mL/min for 30 minutes or more)

Atmosphere: In Ar atmosphere

Sweep rate: 50 mV/sec

Potential sweep range: 0.05 to 1.085 V (vs. RHE)

From the thus-obtained cyclic voltammogram, the charge amount (C) of the hydrogen desorption peak was integrated.

From the concentration and amount of the catalyst ink applied to the glassy carbon electrode, the mass (g) of the platinum was calculated.

From the value obtained by dividing the charge amount (C) of the hydrogen desorption peak by the charge amount ($C/m^2$) per unit active surface area of the platinum and the mass (g) of the platinum, the electrochemical surface area ($m^2$/g-Pt) of the platinum was calculated.

[Surface Platinum Rate]

The surface platinum rate of the fuel cell catalyst was calculated by dividing the calculated electrochemical surface area of the platinum by a geometric platinum surface area. The results are shown in Table 1.

The geometric platinum surface area was calculated by the following method.

First, on the assumption that the platinum particle is spherical, the particle diameter and the surface area per unit mass were calculated from the density, and correlation approximation formula y=279.71/x ($R^2$=1) relating to particle diameter x (nm) and surface area y ($m^2$/g) per unit mass was obtained.

Then, the average particle diameter of the composite containing the platinum and the titanium oxide was measured by small angle X-ray scattering (SAXS). On the assumption that the composite containing the platinum and the titanium oxide is in the form of platinum particles, the geometric platinum surface area was calculated by matching the measured average particle diameter to the correlation approximation formula.

As shown in Table 1, it is clear that the surface platinum rate is 86.60% in Example 1; 97.00% in Example 2; 89.70% in Example 3; 74.20% in Comparative Example 1; and 74.00% in Comparative Example 2. It is clear that the surface platinum rate is higher in Example 1 (washed after firing at 500° C.) than in Comparative Example 1 (not washed after firing at 500° C.). It is also clear that the surface platinum rate is higher in Example 3 (washed after firing at 900° C.) than in Comparative Example 2 (not washed after firing at 900° C.). Therefore, it is clear that the surface platinum rate can be increased by hydrofluoric acid washing.

It is also clear that the surface platinum rate is the highest in Example 2 (washed after firing at 600° C.)

[Power Generation Performance Test]

Samples were taken from the fuel cell catalysts obtained in Examples 1 to 3 and Comparative Examples 1 to 3. Each sample was mixed with a perfluorocarbon sulfonic acid resin (product name: Nafion; manufactured by: DuPont), ethanol and water, and the mixture was stirred well, thereby preparing a catalyst ink.

The catalyst ink was sprayed to both sides of a perfluorocarbon sulfonic acid resin membrane. The applied ink was dried to form catalyst layers on both sides of the membrane, thereby obtaining a membrane catalyst layer assembly.

The thus-obtained membrane catalyst layer assembly was sandwiched between carbon papers for use as gas diffusion layers and hot-pressed, thereby obtaining a membrane electrode assembly. The membrane electrode assembly was sandwiched between two separators (made of carbon), thereby producing a fuel cell.

The thus-obtained fuel cell was caused to produce electric power in the following conditions.

Anode gas: Hydrogen gas at a relative humidity (RH) of 100% (bubbler dew point 80° C.)
Cathode gas: Pure oxygen at a relative humidity (RH) of 100% (bubbler dew point 80° C.)
Cell temperature (cooling water temperature): 80° C.

[Power Generation Performance Evaluation]

Figure 8:
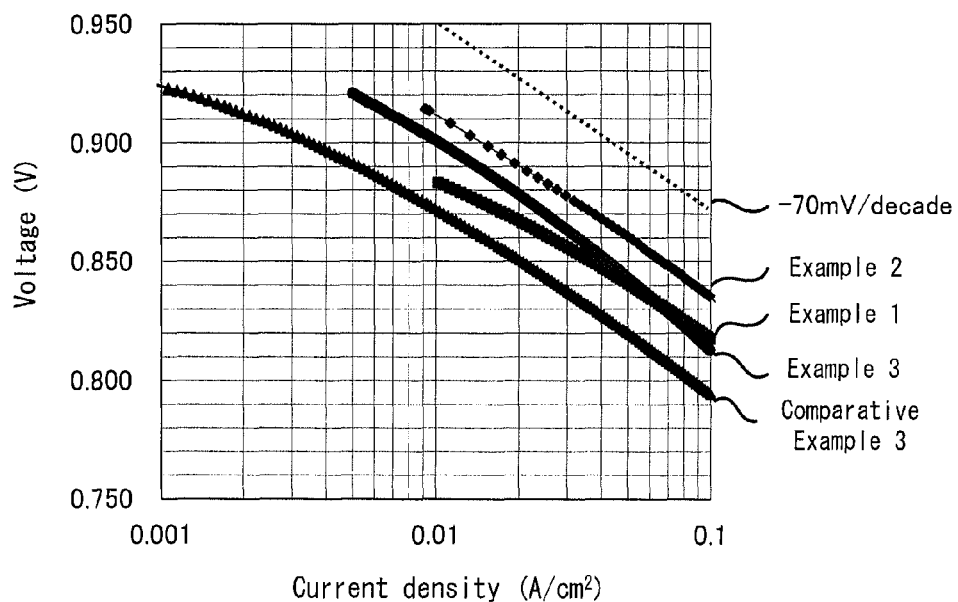
FIG. 8 is a view showing current density-voltage curves in Examples 1 to 3 and Comparative Example 3.

A current density-voltage curve was obtained by power generation. The voltages of Examples 1 to 3 and Comparative Examples 1 to 3 at a current density of 0.1 A/cm$^2$, are shown in Table 1. Also, the results of the current density-voltage curves in Examples 1 to 3 and Comparative Example 3 are shown in FIG. 8. The −70 mV/decade curve shown in FIG. 8 is a Tafel slope in a minute current range. Symbols shown in Table 1 correspond to those in FIG. 8.

As shown in Table 1, it is clear that the voltage at a current density of 0.1 A/cm$^2$ is 0.817 V in Example 1; 0.835 V in Example 2; 0.812 V in Example 3; 0.688 V in Comparative Example 1; 0.761 V in Comparative Example 2; and 0.795 V in Comparative Example 3.

[MEA Performance]

For Examples 1 to 3 and Comparative Examples 1 and 2, the actual measured value for a voltage difference with Comparative Example 3 at 0.1 A/cm$^2$ in the current density-voltage curve obtained by the power generation of the fuel cell, was calculated. The results are shown in Table 1.

As shown in Table 1, it is clear that the actual measured value for the voltage difference at a current density of 0.1 A/cm$^2$ is 22 mV (=0.817 V−0.795 V) in Example 1; 40 mV (=0.835 V−0.795 V) in Example 2; 17 mV (=0.812 V−0.795 V) in Example 3; −107 mV (=0.688 V−0.795 V) in Comparative Example 1; and −34 mV (=0.761 V−0.795 V) in Comparative Example 2.

[RDE Performance]

For Examples 1 to 3 and Comparative Examples 1 and 2, from the mass activity measured with the RDE, the estimated value of the voltage difference with Comparative Example 3 at a current density of 0.1 A/cm$^2$ was calculated by the mass activity ratio measured with the RDE and the Tafel slope (−70 mV/decade). The results are shown in Table 1.

As shown in Table 1, it is clear that the estimated value of the voltage difference at a current density of 0.1 A/cm$^2$ is 16 mV (=log(343/200)×70 mV) in Example 1; 39 mV (=log(720/200)×70 mV) in Example 2; 17 mV (=log(350/200)×70 mV) in Example 3; 8 mV (=log(261/200)×70 mV) in Comparative Example 1; and 12 mV (=log(295/200)×70 mV) in Comparative Example 2.

[Comparison Between RDE Performance and MEA Performance]

The estimated value for the voltage difference calculated from the mass activity measured with the RDE, was determined as the electrode performance (RDE performance) of the catalyst in the form of powder. The actual measured value calculated from the current density-voltage curve obtained by the power generation of the fuel cell, was determined as the electrode performance of the membrane electrode assembly thus formed (MEA performance). The difference between the estimated value and the actual measured value was calculated, and the RDE performance and the MEA performance were compared to each other. The results are shown in Table 1 and FIG. 9.

TABLE 1

| Catalyst | Symbol | Mass activity (A/g) | Surface Pt rate (%) | Voltage @ 0.1 A/cm$^2$ | Voltage difference with Comparative Example 3 @ 0.1 A/cm$^2$ | | Difference between RDE performance and MEA performance |
| --- | --- | --- | --- | --- | --- | --- | --- |
| | | | | | Estimated value (mV) | Actual measured value (mV) | |
| Example 1 | ■ | 343 | 86.60 | 0.817 | 16 | 22 | 6 |
| Example 2 | ♦ | 720 | 97.00 | 0.835 | 39 | 40 | 1 |
| Example 3 | ● | 350 | 89.70 | 0.812 | 17 | 17 | 0 |
| Comparative Example 1 | | 261 | 74.20 | 0.688 | 8 | −107 | −115 |
| Comparative Example 2 | | 295 | 74.00 | 0.761 | 12 | −34 | −46 |
| Comparative Example 3 | ▲ | 200 | — | 0.795 | — | — | — |

As shown in Table 1, it is clear that the difference between the estimated value and the actual measured value is 6 mV (=22 mV−16 mV) in Example 1; 1 mV (=40 mV−39 mV) in Example 2; 0 mV (=17 mV−17 mV) in Example 3; −115 mV (=−107 mV−8 mV) in Comparative Example 1; and −46 mV (=−34 mV−12 mV) in Comparative Example 2.

Figure 9:
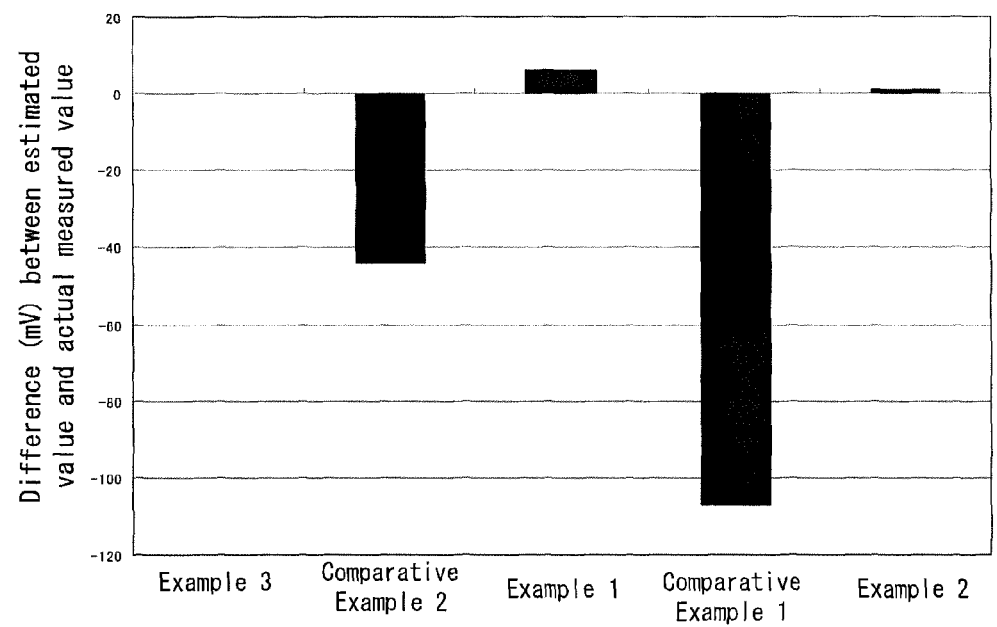
FIG. 9 is a view showing a difference between RDE performance and MEA performance for fuel cell catalysts in Examples 1 to 3 and Comparative Examples 1 and 2.

As shown in Table 1 and FIG. 9, it is clear that for Comparative Examples 1 and 2 (not washed with the hydrofluoric acid), the difference between the RDE performance and the MEA performance is large and the MEA performance is inferior to the RDE performance. Meanwhile, it is clear that for Examples 1 to 3 (washed with the hydrofluoric acid), the RDE performance and the MEA performance are similar to each other.

The invention claimed is:

1. A method for producing a fuel cell catalyst in which a composite containing platinum and a titanium oxide is supported on an electroconductive support, wherein the method comprises:

a mixing step in which, by mixing a platinum-containing solution, a titanium-containing solution and an electroconductive support in a solvent, a catalyst precursor in which a platinum ion compound and a titanium ion compound are supported on the electroconductive support, is formed;

a solvent removing step in which, by removing the solvent from a mixture thus obtained after the mixing step, the catalyst precursor is obtained;

a firing step in which, by firing the catalyst precursor at a temperature of 500 to 900° C. in a hydrogen gas atmosphere after the solvent removing step, a fired product in which a composite containing the platinum and the titanium oxide is supported on the electroconductive support, is obtained; and a washing step in which, by washing the fired product with hydrofluoric acid after the firing step, at least a portion of the titanium oxide is removed and a catalyst in which the composite containing the platinum and the titanium oxide is supported on the electroconductive support is obtained.

2. The method for producing the fuel cell catalyst according to claim 1, wherein, in the mixing step, the catalyst precursor is formed in a reducing gas or inert gas atmosphere, by use of tetrahydrofuran (dehydrated) as the solvent, a solution containing tris(dibenzylideneacetone)diplatinum as the platinum-containing solution, and a solution containing tetrachlorobis(tetrahydrofuran)titanium(IV) as the titanium-containing solution.

3. The method for producing the fuel cell catalyst according to claim 1, wherein a mixed solvent of water and isopropyl alcohol is used as the solvent; a solution containing $K_2Pt(OH)_6$ is used as the platinum-containing solution; and a solution containing $Ti(O\text{-}i\text{-}C_3H_7)_2(C_6H_{14}O_3N)_2$ is used as the titanium-containing solution.

4. The method for producing the fuel cell catalyst according to claim 1, wherein the electroconductive support contains at least one of a carbonaceous material and a metal material.

5. The method for producing the fuel cell catalyst according to claim 2, wherein the electroconductive support contains at least one of a carbonaceous material and a metal material.

6. The method for producing the fuel cell catalyst according to claim 3, wherein the electroconductive support contains at least one of a carbonaceous material and a metal material.

* * * * *